United States Patent
Andersson et al.

(10) Patent No.: US 8,505,484 B2
(45) Date of Patent: Aug. 13, 2013

(54) MILKING ROBOT, AND A MILKING ARRANGEMENT

(75) Inventors: Jan-Erik Andersson, Tumba (SE); Thomas Axelsson, Farsta (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 13/701,562

(22) PCT Filed: Jun. 1, 2011

(86) PCT No.: PCT/SE2011/050685
§ 371 (c)(1),
(2), (4) Date: Dec. 3, 2012

(87) PCT Pub. No.: WO2011/152790
PCT Pub. Date: Dec. 8, 2011

(65) Prior Publication Data
US 2013/0074775 A1     Mar. 28, 2013

Related U.S. Application Data

(60) Provisional application No. 61/351,055, filed on Jun. 3, 2010.

(30) Foreign Application Priority Data

Jun. 3, 2010   (SE) ................................ 1050564

(51) Int. Cl.
*A01J 7/00* (2006.01)
(52) U.S. Cl.
USPC .................................... 119/14.04; 119/14.08

(58) Field of Classification Search
USPC .......... 119/14.04, 14.47, 14.01, 14.02, 14.03, 119/14.14, 14.08
See application file for complete search history.

(56) References Cited

U.S. PATENT DOCUMENTS

| 4,716,350 A | 12/1987 | Huang et al. |
| 4,941,433 A * | 7/1990 | Hanauer .................... 119/14.02 |

(Continued)

FOREIGN PATENT DOCUMENTS

| EP | 0 672 507 A1 | 9/1995 |
| EP | 0 900 522 A1 | 3/1999 |

(Continued)

OTHER PUBLICATIONS

International-Type Search Report, dated Nov. 11, 2010, from corresponding PCT application.

(Continued)

*Primary Examiner* — Yvonne Abbott
(74) *Attorney, Agent, or Firm* — Young & Thompson (57) ABSTRACT

A milking arrangement includes a milking robot (10) having a first link ($L_1$), a second link ($L_2$), a third link ($L_3$), an end effector (E), sensor (16) and a control unit (15). The first link is rotatable to a first angle within a first angle range ($\alpha_1$) via a first joint (11). The second link is rotatable to a second angle within a second angle range ($\alpha_2$) via a second joint (12). The third link ($L_3$) is rotatable to a third angle within a third angle range ($\alpha_3$) via third joint (13). The links ($L_1$, $L_2$, $L_3$) are rotatable so that the end effector is movable within a three-dimensional workspace (W). Each position of the end effector within the workspace corresponds to a single combination of the first, second and third angles.

20 Claims, 6 Drawing Sheets

(56) References Cited

U.S. PATENT DOCUMENTS

| | | | |
|---|---|---|---|
| 4,967,126 A | 10/1990 | Gretz et al. | |
| 5,784,994 A * | 7/1998 | van der Lely | 119/14.08 |
| 5,967,081 A * | 10/1999 | Street et al. | 119/14.08 |
| 6,357,387 B1 * | 3/2002 | Johannesson | 119/14.47 |
| 2003/0171847 A1 | 9/2003 | Cheng et al. | |
| 2007/0112468 A1 | 5/2007 | Freeman | |

FOREIGN PATENT DOCUMENTS

| | | |
|---|---|---|
| RU | 1777728 A1 | 11/1992 |
| SU | 511919 A | 6/1976 |
| SU | 1113055 A | 9/1984 |
| WO | 95/23054 A1 | 8/1995 |
| WO | 02/00011 A1 | 1/2002 |
| WO | 2004/062352 A1 | 7/2004 |
| WO | 2008/104416 A1 | 9/2008 |
| WO | 2009/113884 A2 | 9/2009 |
| WO | 2010/014002 A1 | 2/2010 |

OTHER PUBLICATIONS

International Search Report, dated Sep. 1, 2011, from corresponding PCT application.

Supplementary International Search Report, dated Apr. 19, 2012, from corresponding PCT application.

Shimizu et al., "Analytical Inverse Kinematic Computation for 7-DOF Redundant Manipulators With Joint Limits and Its Application to Redundancy Resolution", IEEE Transactions of Robotics, Oct. 1, 2008, pp. 1131-1142, vol. 24, No. 5; Cited in International Search Report.

* cited by examiner

MILKING ROBOT, AND A MILKING ARRANGEMENT

BACKGROUND OF THE INVENTION AND PRIOR ART

The present invention refers to a milking robot for handling teatcups of a milking machine and cleaning cups for cleaning the teats of an animal prior to milking. The milking robot is especially configured for attaching the cleaning cup and/or the teatcups to the teats of the animal. More precisely, the invention refers to a milking robot according to the pre-characterizing part of claim 1. The invention also refers to a milking arrangement.

It is known to use industrial robots within the manufacturing industry. It is also known to use an industrial robot as a so called milking robot in connection with milking of animals, see for instance EP-A-900 522.

An industrial robot is, according to the European Standard EN ISO 10218-1:2008, an automatically controlled, reprogrammable multipurpose manipulator, programmable in three or more axes, which may be either fixed in place or mobile for use in industrial automation applications.

One known problem of industrial robots is the phenomenon of singularities. There are several causes to singularities. Workspace interior singularities are those which occur inside but away from the workspace boundary and generally are caused by two or more joint axes lining up, see *Introduction to ROBOTICS; mechanics and control*; second edition; John J. Craig, 1995; page 173. A singularity occurs in a joint of a multi-link robot when the acceleration of one link would be infinite. In other words, a singularity means that the robot can choose between two or more different link positions to reach an arbitrary position in the three-dimensional workspace. If a singularity occurs, the industrial robot can run out of control, and is thus not safe.

The milking robot disclosed in EP-A-900 522 comprises a first link rotatable around a first vertical axis to a first angle within a first angle range via a first joint, a second link attached to the first link and rotatable around a second axis to a second angle within a second angle range via a second joint, and a third link attached to the second link and rotatable around a third axis to a third angle within a first angle range via third joint. A gripper is attached to the third link.

The gripper of EP-A-900 522 is rotatable around a first turning axis being parallel to the third link and around a second turning axis being perpendicular to the first turning axis in order to enable the gripper to hold the teatcup in a vertical position or in an inclined position corresponding to a possible inclination of the teat. However, due to the gripper being rotatable around the second turning axis a singularity does occur. For a given inclination or position of the gripper, with respect to the second turning axis, several values of the first, second and third angles are possible. Consequently, the design shown in EP-A-900 522 can not be regarded as sufficiently safe in all possible situations that can occur in a milking stall and during a milking operation.

SUMMARY OF THE INVENTION

The object of the invention is to provide a milking robot with a simple, inexpensive and light design. Furthermore, the object of the invention is to provide such a milking robot which is safe, and which can be used among animals and people without exposing them to any danger. In addition, it is aimed at a milking robot that is compliant with regard to forces exerted by the animal and rigid so that a proper accuracy can be achieved.

This object is achieved by the milking robot initially defined, which is characterized in that the each position of the end effector within the workspace corresponds to a single combination of the first, second and third angles.

By such a restriction to the movements of the first, second and third link it can be ensured that no singularity can occur. The milking robot according to the invention is thus safe in the sense that the movement of the links to any arbitrary position within the workspace can be predicted. The restriction of the movements are achieved by limiting the number of axes (degrees of freedom) and/or by limiting the angle ranges.

Thanks to the limited number of links, the manufacturing costs of the milking robot can be relatively low, and the design can be relatively light and simple.

According to an embodiment of the invention, the rotatability of the first link, the second link and the third link is limited by means of first, second and third stop means, respectively, so that the end effector is retained within the workspace. The first, second and third stop means are configured to limit the first, second and third, respectively, angle ranges.

According to a further embodiment of the invention, the first, second and third stop means comprise respective physical stop members. Such physical stop members may comprise abutment surfaces which define end positions to the links and thus limit the movements of the links.

According to another embodiment of the invention, the first, second and third stop means comprise a software program comprised by the control unit. Such software stop means may be provided as an alternative or supplement to the physical stop members.

According to a further embodiment of the invention, the workspace tapers towards a line, which coincides with a, preferably vertical line through the first joint or with the first axis. For instance, the workspace may have a triangular extension seen in the direction of the first axis. The first axis, around which the first link rotates, may be vertical, wherein the workspace from the first axis widens in a direction towards the milking place where the animal to be milked is present. The first axis may also be horizontal, wherein the workspace widens from said preferably vertical line towards the milking place where the animal is present.

According to a further embodiment of the invention, the end effector comprises a centre point, which defines the position of the end effector in a control algorithm included in the control unit and provided for controlling the milking robot. Consequently, when defining the position of the end effector in the control unit, it is the centre point which is defined. The distance and the angle from the centre point to, for instance, the teatcup can be added by the control algorithm as a correction value. Advantageously, the control algorithm of the control unit may then be configured to calculate the first, second and third angles of the links for a certain position of the centre point. Furthermore, the third link may have a longitudinal centre axis, wherein the centre point is located on the longitudinal centre axis.

According to a further embodiment of the invention, the end effector is configured as a gripper being attached to the third link, which has a longitudinal centre axis, wherein the gripper is rotatable 180° around the longitudinal centre axis. Advantageously, the gripper may be rotatable around the longitudinal centre axis to take one of a gripping position and an application position positioned 180° from the gripping position with respect to the longitudinal centre axis. The gripping position may be the position where the gripper is configured to grip the teatcup from a teatcup magazine located at the milking place close to the animal. The application position is the position of the gripper which is suitable for applying the teatcup to the teat of the animal to be milked.

According to a further embodiment of the invention, the gripper comprises a gripper element, which is rotatable around a fifth axis, extending perpendicularly to the longitudinal centre axis, from a first gripper element position to a second gripper element position. Thanks to this rotatability around the fifth axis, the gripper element can be brought out of the sight line of the sensor. Advantageously, the gripper element is biased to the first gripper element position.

According to a further embodiment of the invention, the end effector is constituted by the third link. Advantageously, the end effector may be configured as or comprises a nozzle for supplying a fluid onto the object, such as a spray nozzle for spraying after treatment liquid onto a teat when the teatcup has been removed after the milking.

According to a further embodiment of the invention, the first link has a first active length, the second link a second active length and the third link a third active length, wherein the second and third active lengths are at least twice the first active length or wherein the first and second active lengths are at least twice the third active length. By providing two of the links with a relatively long length, the variation of the angle of the gripper can be reduced or minimized, which improves the possibility of the sensor to sense the teats of the animal.

According to a further embodiment of the invention, the first joint actuator, the second joint actuator and the third joint actuator comprise a first, second and a third, respectively, compliance means configured to permit movement of the respective link in response to an externally exerted force when the external force exceed a predetermined value. Consequently, the milking robot will be compliant with regard to large forces exerted by the animal so that the risk of damaging the milking robot is reduced. Advantageously, the first joint actuator, the second joint actuator and the third joint actuator comprise a respective hydraulic actuator operated by means of a hydraulic medium, wherein the compliance means comprise at least one overflow valve configured to open for the hydraulic medium when the external force exceeds the predetermined value.

The object of the invention is also achieved by a milking arrangement comprising a milking parlour comprising a plurality of milking places, each being configured to house an animal to be milked and each comprising a teat cup magazine holding a set of teat cups, and at least one milking robot provided beside the milking parlour. Advantageously, the milking parlour comprises a rotary milking platform.

According to a further embodiment of the invention, the milking arrangement comprises at least one carrying device configured to be positioned beside the rotary milking platform and to carry the milking robot and control means configured to control the carrying device to support the milking robot to follow the rotation of the rotary milking platform so that the milking robot is in a fixed position in relation to one of the milking places of the rotary milking platform.

BRIEF DESCRIPTION OF THE DRAWINGS

The present invention will now be explained more closely by means of a description of various embodiments and with reference to the drawings attached hereto.

DETAILED DESCRIPTION OF VARIOUS EMBODIMENTS OF THE INVENTION

Figures 1, 6:
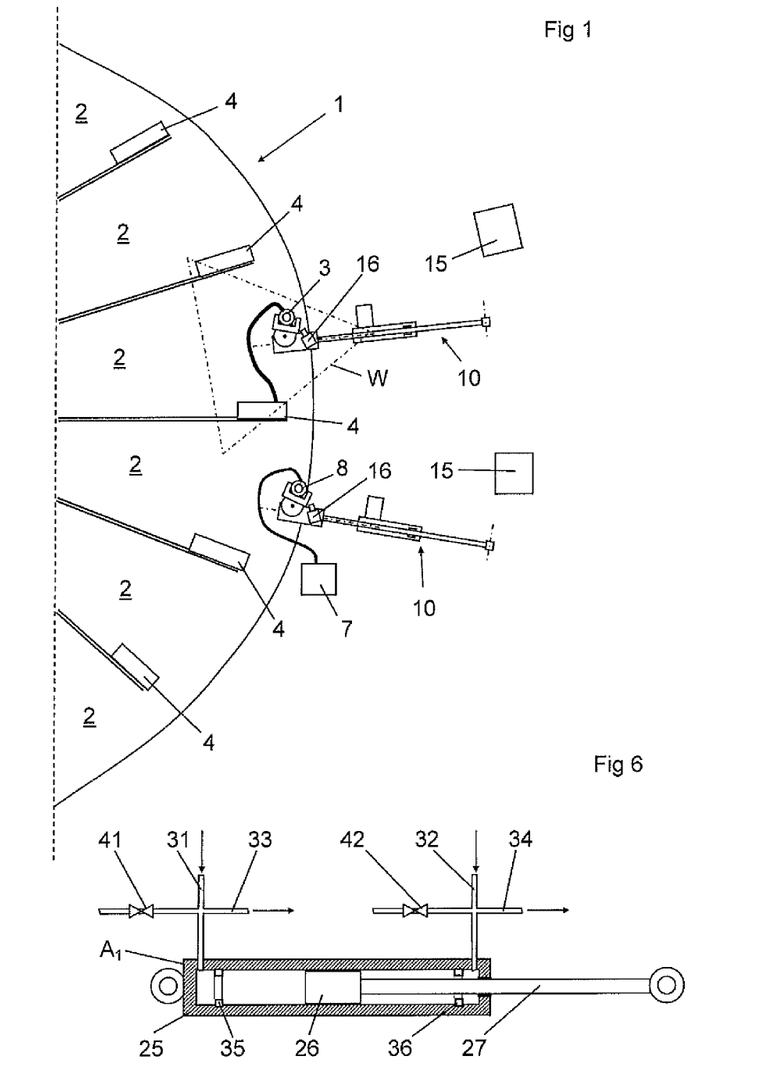
FIG. 1 shows schematically a view from above of a part of a milking arrangement.
FIG. 6 shows a side view of an actuator of the milking robot in FIG. 4.

FIG. 1 discloses a milking arrangement comprising a milking parlour and two milking robots. In the embodiments disclosed, the milking parlour comprises or is in the form of a rotary milking platform 1. It is to be noted that the milking parlour also may have another design, such as a so called herringbone parlour etc. The rotary milking platform 1 is rotatable around a vertical platform axis (not shown). The rotary milking platform 1 comprises a plurality of milking places 2 arranged in an annular configuration on the rotary milking platform 1. Each milking place 2 comprises a milking machine (not disclosed) comprising a milking member having a number of teatcups 3, normally four teatcups 3. Each milking place 2 also comprises a teatcup magazine 4 configured to hold the teatcups 3 during the time period between the milking operations. The teatcups 3 are held in an upside down position in the teatcup magazine 4, i.e. the opening of the teatcup 3 is turned downwards when the teatcup 3 is held in the teatcup magazine 4.

The milking arrangement also comprises a cleaning device 7 having a cleaning cup 8. The cleaning device 7 is in the embodiment disclosed arranged outside the rotary milking platform 1.

In the embodiments disclosed, the milking arrangement comprises two milking robots 10. One of the milking robots 10 is provided for holding the cleaning cup 8 and attaching the cleaning cup 8 to a teat of the animal to be milked in order to clean the teat before the milking operation, i.e. before the teatcup 3 is attached to the teat. The other milking robot 10 is provided for attaching the teatcups 3 to the teats of the animal. It is to be noted that the milking arrangement can include fewer or more milking robots 10, for instance two or more milking robots for cleaning and two or more milking robots 10 for attaching the teatcups. It is also possible to include only one milking robot 10 that may be configured to attach first the cleaning cup 8 and then after the cleaning operation to attach the teatcups 3 to the teats of the animal.

The configuration of a first embodiment of the milking robot 10 is now to be explained more closely with reference to FIGS. 2-6. As can be seen the milking robot 10 is a three link robot with three axes, and comprises a first link $L_1$, a second link $L_2$ and a third link $L_3$. The first link $L_1$ is attached to a base member 9 and rotatable around a first axis $x_1$ to a first angle within a first angle range $\alpha_1$ via a first joint 11 by means of a first joint actuator $A_1$. The second link $L_2$ is attached to the first link $L_1$ and rotatable around a second axis $x_2$ to a second angle within a second angle range $\alpha_2$ via a second joint 12 by means of a second joint actuator $A_2$. The third link $L_3$ is attached to the second link $L_2$ and rotatable around the third axis $x_3$ to a third angle within a third angle range $\alpha_3$ via a third joint 13 by means of a third joint actuator $A_3$. The base member 9 may be mounted on the ground.

Figure 2:
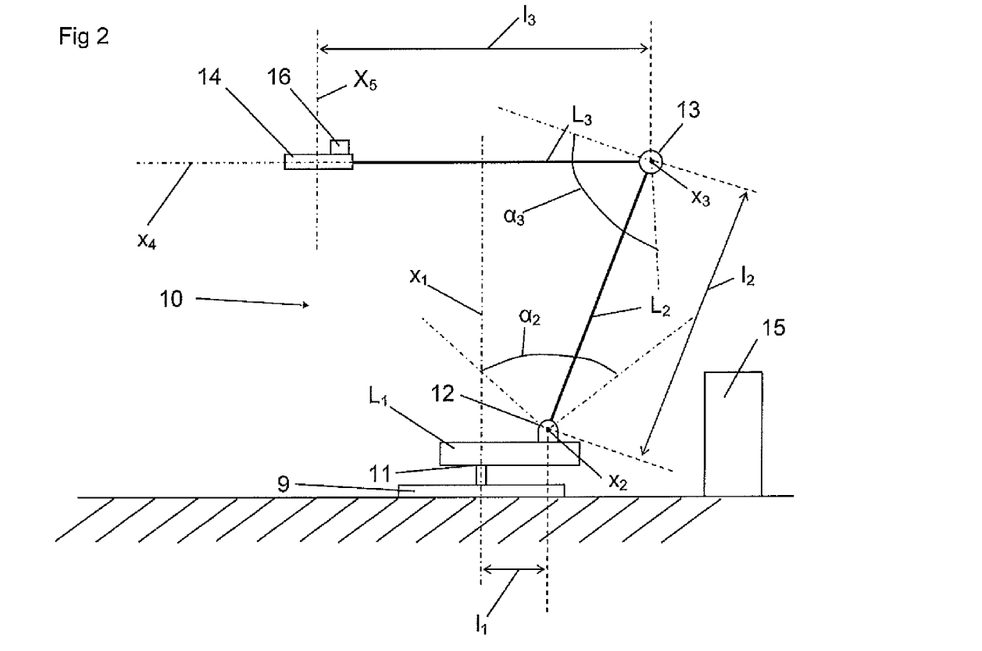
FIG. 2 shows schematically a side view of a milking robot according to a first embodiment of the milking arrangement in FIG. 1.
Figure 3:
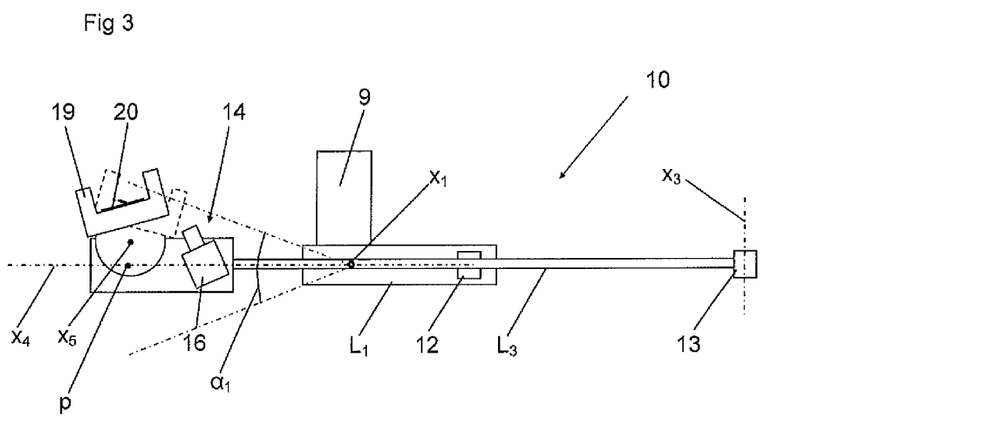
FIG. 3 shows schematically a view from above of a part of the milking robot in FIG. 2.
Figure 4:
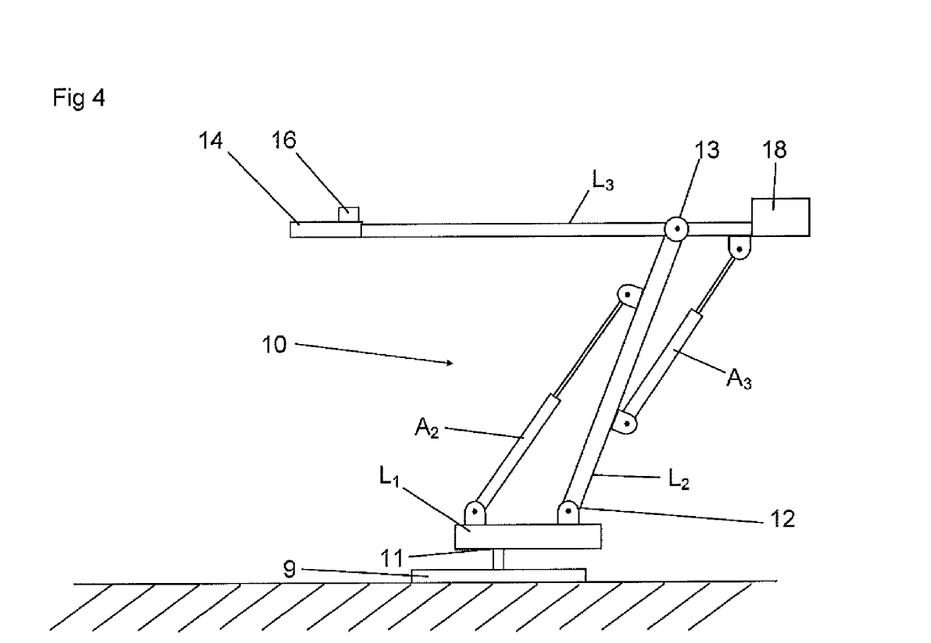
FIG. 4 shows a side view of the milking robot according to the first embodiment.
Figure 5:
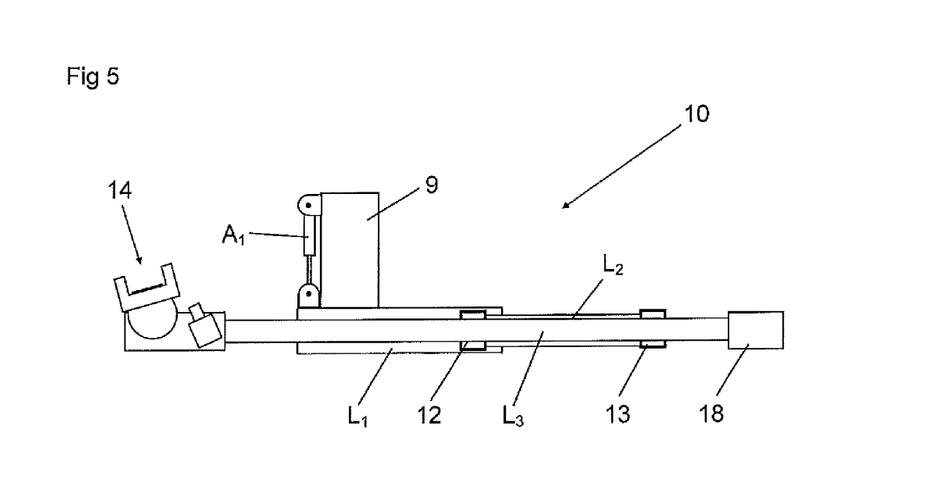
FIG. 5 shows a view from above of the milking robot in FIG. 4.

The first link $L_1$ is rotatable around the first axis $x_1$ within the first angle range $\alpha_1$ with respect to the first axis $x_1$. The second link $L_2$ is rotatable around the second axis $x_2$ within the second angle range $\alpha_2$ with respect to the second axis $x_2$. The third link $L_3$ is rotatable around the third axis $x_3$ within the third angle range $\alpha_3$ with respect to the third axis $x_3$.

The milking robot 10 also comprises an end effector E. In the first embodiment, the end effector E comprises or is configured as a gripper 14 which is attached to the third link $L_3$. The first link $L_1$, the second link $L_2$ and the third link $L_3$ are rotatable so that the gripper 14 is movable within a three-dimensional workspace W, see FIG. 1, of the milking robot 10.

Furthermore, the milking robot 10 comprises a control unit 15 and a sensor 16. The sensor 16 is configured to sense a position of an object, such as the teatcup in the teatcup magazine 4, and a teat of an animal present in the milking place 2. The sensor 16 can be of any suitable kind such as a video camera, a laser-sensor or a time-of-flight-camera. The control unit 15 is configured to control the first joint actuator $A_1$, the second joint actuator $A_2$ and the third joint actuator $A_3$ to move the gripper 14 to the position sensed by the sensor 16. The control unit 15 comprises suitable hardware and software including a control algorithm configured to control the movements of the joint actuators $A_1$, $A_2$ and $A_3$.

As can be seen in FIG. 1, the workspace W tapers towards the first axis $x_1$ when seen in a view from above. In this view, the workspace W thus has a triangular-like shape. However, the workspace W is three-dimensional and extends also in a vertical direction. In the embodiment disclosed, the workspace W is delimited in such a way that it tapers towards a line coinciding with the first axis $x_1$. In the embodiments disclosed, this line and the first axis $x_1$ are vertical. The workspace thus widens from the line or first axis $x_1$ towards the milking place 2.

The end effector E, in the first embodiment the gripper 14, comprises a centre point p, see FIG. 3, which defines the position of the gripper in the control algorithm. As also can be seen in FIG. 3, the third link $L_3$ has a longitudinal centre axis $x_4$. The centre point p of the gripper 14 is located on the longitudinal centre axis $x_4$.

The gripper 14 is a rotatable 180° around the longitudinal centre axis $X_4$ to take one of a gripping position and an application position positioned 180° from the gripping position. In the gripping position, the gripper 14 is configured to grip a teatcup 3 from the teatcup magazine 4 in its position upside down. In the application position, the gripper 4 is configured to hold the teatcup 3 in a position with the opening of the teatcup 3 turned upwards so that the teatcup 3 in the application position of the gripper 14 can be applied to the teat of the animal. The milking robot 10 comprises a drive member 18 for rotating the gripper 14 to take one of the gripping position and the application position. Suitable gripper stop members (not disclosed) are provided for defining the gripping position and the application position of the gripper 14 and for preventing the gripper 14 from being rotated outside these positions.

The gripper 14 comprises a gripper element 19 in which the teatcup 3 or the cleaning cup 7 are to be held. The gripper 14 thus defines a teatcup position in the gripper element 19. The gripper element 19 comprises in the embodiment disclosed an electromagnet 20 for gripping and holding the teatcup 3 and the cleaning cup 8, respectively. The gripper element 19 is rotatable around a fifth axis $x_5$. The fifth axis $x_5$ extends perpendicularly to the longitudinal centre axis $x_4$. The centre point p may be located on the fifth axis $x_5$. The gripper element 19 is rotatable around the fifth axis $X_5$ from a first gripper element position to a second gripper element position. The purpose of the rotatability of the gripper element 19 is to prevent the gripper element 19 from interfering with the sensor 16, i.e. to keep the gripper element 19 out of sight of the sensor 19. Advantageously, the gripper element 19 is biased to the first gripper element position by means of a spring element (not disclosed) and movable to the second gripper element position by means of a gripper drive (not disclosed). Suitable gripper element stop members (not disclosed) are provided for defining the first gripping element position and the second gripping element position and for preventing the gripping element 19 from being rotated outside these positions.

The milking robot 10 is configured in such a way that each position of the gripper 14 within the workspace W corresponds to a single combination of the first angle, the second angle and the third angle. The milking robot 10 comprises stop means, wherein the rotatability of the first link $L_1$, the second link $L_2$ and the third link $L_3$ is limited by means of first stop means, second stop means and third stop means, respectively. By the provision of these first, second and third stop means the gripper 14 can be retained within the workspace W during the operation of the milking robot 10. The stop means are preferably configured in such a way that the milking robot 10 cannot permit the gripper 14 to be positioned outside the workspace W also when the milking robot is not in operation. The stop means can be realized in various ways.

FIG. 6 shows a sectional view of the first joint actuator $A_1$. In the embodiment disclosed the joint actuators $A_1$, $A_2$, $A_3$ comprise a respective hydraulic actuator operated by means of a hydraulic medium. Each of the joint actuators $A_1$, $A_2$, $A_3$ comprises a cylinder 25, a piston 26 movable in the cylinder 25, and a piston rod 27. The hydraulic medium may be supplied and discharged in various ways. In the embodiment disclosed, the hydraulic medium is supplied via a first inlet 31 or a second inlet 32 and discharged via first outlet 33 or a second outlet 34 in order to move the piston in either direction.

In the embodiment disclosed in FIG. 6, the first stop means comprise two physical stop members 35 and 36 defining a forward end position and a rear end position, respectively, of the piston 26 and the piston rod 27 in the cylinder 25. As can be seen these stop members 35, 36 are provided in the cylinder 25, but it is to be understood that they may be provided at any suitable position on or in the proximity of the first joint actuator $A_1$. By means of such stop members 35, 36, the end positions of the first angle range $\alpha_1$ are defined. It is to be noted that also the second joint actuator $A_2$ and the third joint actuator $A_3$ may comprise such physical stop members 35, 36 defining the end positions of the second angle range $\alpha_2$ and the third angle range $\alpha_3$, respectively.

The stop members 35, 36 may also be formed by a cylinder 25 that is configured to have a determined stroke length. The stop members are then formed by the ends of the cylinder 25.

As an alternative or supplement, the first, second and third stop means may comprise a software program included in the control algorithm comprised by the control unit 15.

The control algorithm of the control unit 15 calculates the first, second and third angles of the links $L_1$, $L_2$, $L_3$ for a certain position of the centre point p. This position determined by the position sensed by the sensor 16 and a correction value determined by the distance and angle from the centre point to the teatcup position in the gripper 14. The rotation of the gripper 14 around the longitudinal centre axis $x_4$ and the rotation of the gripping element 19 around the fifth axis $x_5$ are not included in the control algorithm for moving the centre point to said certain position. These two latter movements may be added in specific situations for rotating the gripper for gripping a teatcup from the teatcup magazine 4 and for rotating the gripping element 19 not to interfere with the sensor 16.

The first link $L_1$ has a first active length $l_1$, which is determined by the distance between the first axis $x_1$ and the second axis $x_2$ seen in the direction of the first axis $x_1$. The second link $L_2$ has a second active length $l_2$, which is determined by the distance between the second axis $x_2$ and the third axis $x_3$. The third link $L_3$ has a third active length $l_3$, which is determined by the distance between the second axis $x_2$ and the centre point p of the gripper 14. The second active length $l_2$ and third active length $l_3$ are relatively long in comparison with the first active length $l_1$. More specifically the second active length $l_2$ and third active length $l_3$ may be at least twice the first active length $l_1$. The second active length $l_2$ and third active length $l_3$ may be approximately equal.

The first joint actuator $A_1$, the second joint actuator $A_2$ and the third joint actuator $A_3$ comprise first, second and third, respectively, compliance means configured to permit movement of the respective link $L_1$, $L_2$ and $L_3$ when an external force, which exceeds a predetermined value, is exerted on the milking robot. The compliance means are provided to be compliant with respect to all of the actuators $A_1$, $A_2$ and $A_3$, and preferably also with respect to the drive member 18 and the gripper drive.

In FIG. 6 one possible embodiment of the compliance means for the first joint actuator $A_1$ is disclosed. This the compliance means comprise a first overflow valve 41 configured to open for the hydraulic medium when an external force, acting on the milking robot in one direction, exceeds the predetermined value, and a second overflow valve 42 configured to open for the hydraulic medium when an external force, acting on the milking robot in an opposite direction, exceeds the predetermined value. The second joint actuator $A_2$ and the third joint actuator $A_3$ may also comprise such compliance means as exemplified with respect to respective the first joint actuator $A_1$.

A further possible embodiment of the milking robot may include an additional movement along a transversal direction of the milking place 2. Such an additional movement may be realized as a movement of the base member 9 along a rail mounted on the ground, or a rotation of the base member 9 around an axis located at a significant distance from the first axis $x_1$. The additional movement is also not included in the control algorithm for moving the centre point to said certain position, but is made in order to adjust the milking robot 10 to a correct position in relation to the milking place 2. It is also to be noted that this additional movement can be performed by an additional link attached to the third link $L_3$ and carrying the gripper 14.

FIGS. 7-10 disclose a second embodiment of the milking robot 10. Also the milking robot 10 of the second embodiment is a three link robot having three axes and comprising three links, a first link $L_1$, a second link $L_2$ and a third link $L_3$. The milking robot 10 of the second embodiment differs from the one of the first embodiment in that the end effector E is constituted or formed by the third link $L_3$.

Figure 7:
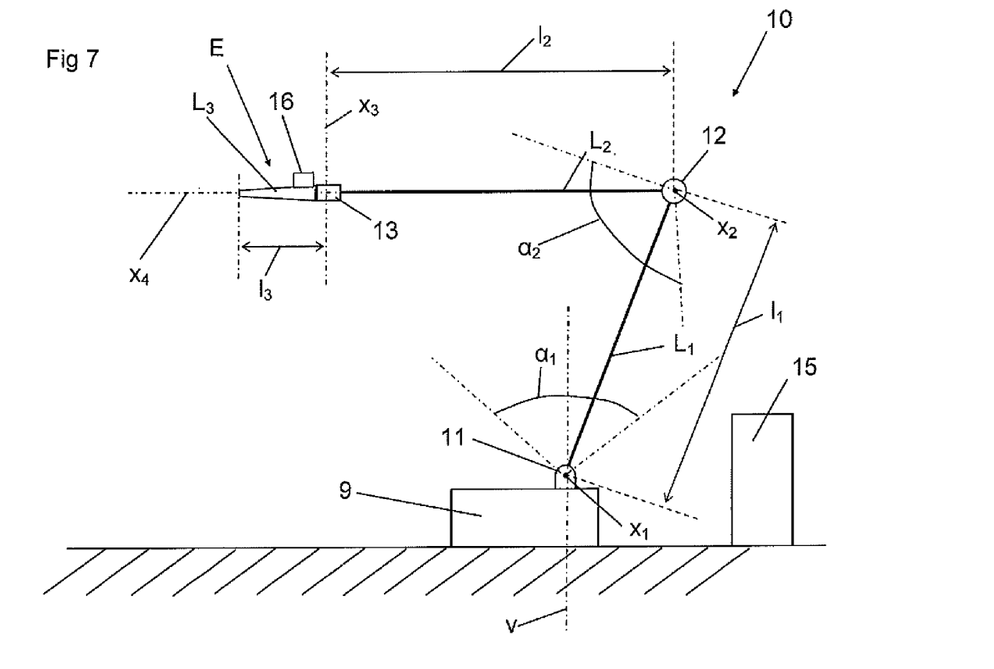
FIG. 7 shows schematically a side view of a milking robot according to a second embodiment of the milking arrangement in FIG. 1.
Figure 8:
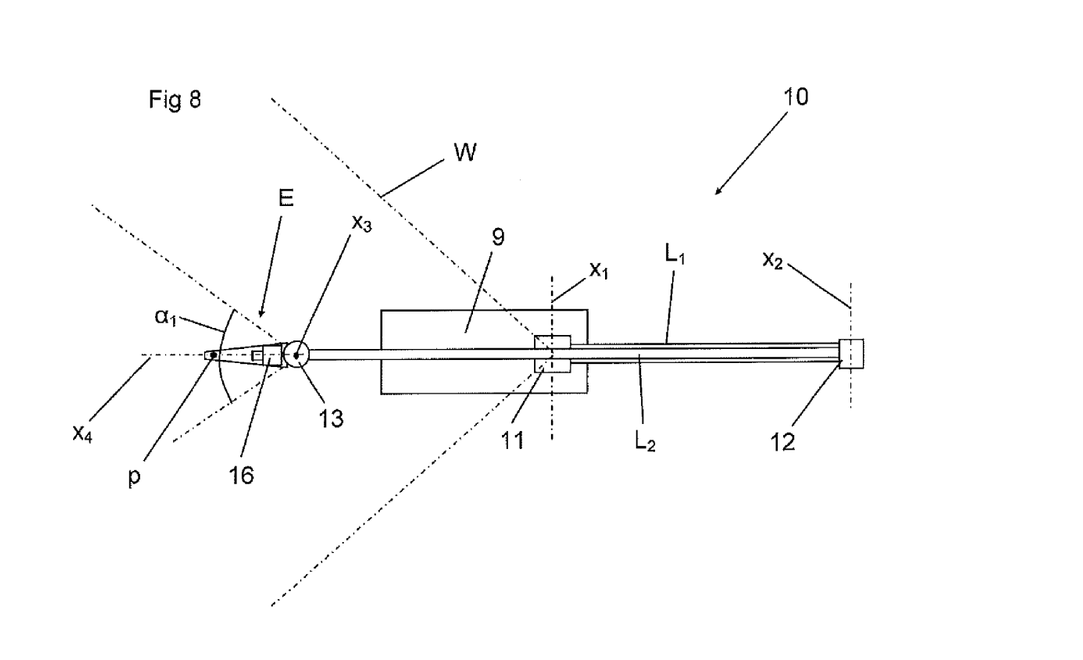
FIG. 8 shows schematically a view from above of a part of the milking robot in FIG. 7.
Figure 9:
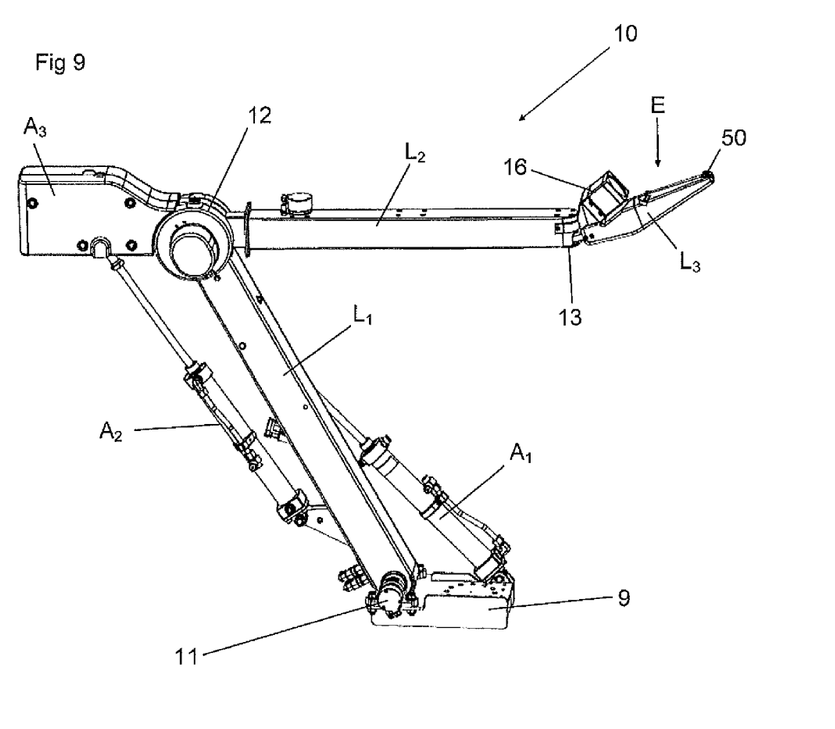
FIG. 9 shows a perspective view of a milking robot according to the second embodiment.
Figure 10:
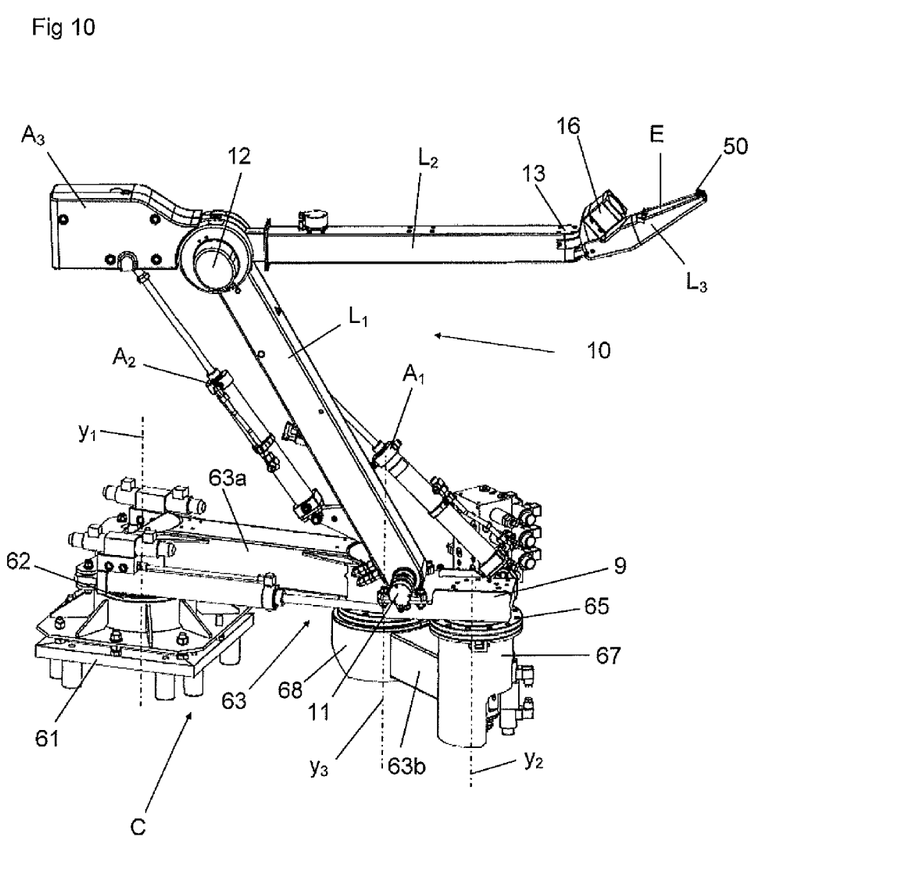
FIG. 10 shows a perspective view of the milking robot in FIG. 9 mounted on a positioning device.

As can be seen in FIGS. 7 and 8, the first link $L_1$ is thus attached to a base member 9 and rotatable around a first axis $x_1$ to a first angle within a first angle range $\alpha_1$ via a first joint 11 by means of a first joint actuator $A_1$, disclosed in FIGS. 9 and 10. In the second embodiment, the first axis $x_1$ extends horizontally or substantially horizontally.

The second link $L_2$ is attached to the first link $L_1$ and rotatable around a second axis $x_2$ to a second angle within a second angle range $\alpha_2$ via a second joint 12 by means of a second joint actuator $A_2$, disclosed in FIGS. 9 and 10. In the second embodiment, the second axis $x_2$ extends horizontally or substantially horizontally.

The third link $L_3$ is attached to the second link $L_2$ and rotatable around the third axis $x_3$ to a third angle within a third angle range $\alpha_3$ via a third joint 13 by means of a third joint actuator $A_3$, disclosed in FIGS. 9 and 10 In the second embodiment, the third axis $x_3$ extends vertically or substantially vertically.

The workspace W tapers in the second embodiment towards a line v, see FIGS. 7 and 8, which may be vertical and extends through the first joint 11. The line v may also be, at least slightly, inclined in relation to a vertical line. Also according the second embodiment, the workspace W may have a triangular extension seen in the direction of said line through the first joint 11.

In the second embodiment, the end effector E is configured as or comprises a nozzle 50, see FIGS. 9 and 10, for supplying a fluid onto the object, see FIGS. 9 and 10. The nozzle 50 may be configured for supplying cleaning liquid onto the teat prior milking or as a spray nozzle for spraying an after treatment liquid onto a teat when the teatcup has been removed after the milking of the teat. It should be noted that the milking robot of the first embodiment could also be provided with an end effector E in the form of or carrying a nozzle 50. Also according to the invention, the milking robot 10 of the second embodiment could be provided with an end effector E in the form of or comprising a gripper 14 for attaching teatcups.

The centre point p, se FIG. 8, may be located on the third link L3, on or in the proximity of the nozzle 50 shown in FIGS. 9 and 10.

The base member 9 may be mounted on the ground as illustrated in FIGS. 7 and 8, or, as illustrated in FIG. 10, be mounted to a carrying device C. The carrying device C comprises a fundament 61, which may be positioned on and mounted to the ground, and a first bearing device 62 provided on the fundament 61. An arm 63 is connected to the first bearing device 62 and permitted to rotate in relation to the fundament 61 around an axis $y_1$ that is parallel with the platform axis of the rotary milking platform 1.

A support platform 65 is connected to the arm 63 and configured to carry the milking robot 10, which is configured to attach the teatcups of the milking machine to an animal present in one of the milking places 2 on the rotary milking platform 1, or to clean or to spray an after treatment liquid onto the teats of the animal.

The carrying device C may also comprise a second bearing device 67 connected to the arm 63 and permitting the support platform 65 to rotate in relation to the arm 63 around an axis $y_2$. The axis $y_2$ extends in parallel, or substantially in parallel, with the vertical axis $y_1$ and the platform axis of the rotary milking platform. The second bearing device 67 is provided at the outer end of the arm 63 and supports the support platform 65 in a rotary manner.

The arm 63 comprises a first arm element 63*a* connected to the first bearing device 62, and a second arm element 63*b* carrying the second bearing device 67. The first arm element 63*a* and the second arm element 63*b* are connected to each other via a third bearing device 68 permitting the second arm element 63*b* to rotate in relation to the first arm element 63*a* around an axis $y_3$. The axis $y_3$ extends through the third bearing device 68 and in parallel with, or substantially in parallel with, the axis $y_1$, the axis $y_2$ and the platform axis of the rotary milking platform.

The carrying device C also comprises a drive arrangement configured to move the support platform 65 and comprising a first drive member connected to the fundament 61 and the arm 63, and arranged to rotate the arm 63 around the axis $y_1$. The drive arrangement also comprises a second drive member connected to the arm 63 and the support platform 65, and arranged to rotate the support platform 65 around the axis $y_2$. Furthermore, the drive arrangement comprises a third drive arm element 63*b*, and arranged to rotate the second arm element 63*b* around the axis $y_3$.

By means of control means, possibly included in the control unit 15, the carrying device C supporting the milking robot 10 may be controlled so that the milking robot 10 follows the rotation of the rotary milking platform 1 so that the milking robot 10 is in a fixed position in relation to one of the milking places 2. It is thus possible to let the milking robot 10 act as if it is stationary in relation to a milking place 2 on the rotary milking platform 1.

The present invention is not limited to the embodiments disclosed but may be varied and modified within the scope of the following claims.

Although the joint actuators $A_1$, $A_2$ and $A_3$, as well as the drive members of the carrying device C, have been disclosed as hydraulic actuators, it is to be noted that one or all of them may also comprise or consist of a pneumatic actuator or an electric actuator.

The invention claimed is:

1. A milking robot (10), comprising:
   a first link ($L_1$) rotatable around a first axis ($x_1$) to a first angle within a first angle range ($\alpha_1$) via a first joint (11) acted on by a first joint actuator ($A_1$),
   a second link ($L_2$) attached to the first link ($L_1$) and rotatable around a second axis ($x_2$) to a second angle within a second angle range ($\alpha_2$) via a second joint (12) acted on by a second joint actuator ($A_2$),
   a third link ($L_3$) attached to the second link ($L_2$) and rotatable around a third axis ($x_3$) to a third angle within a third angle range ($\alpha_3$) via third joint (13) acted on by a third joint actuator ($A_3$),
   an end effector (E),
   wherein the first, second and third links ($L_1$, $L_2$, $L_3$) are rotatable so that the end effector (E) is movable within a three-dimensional workspace (W) of the milking robot (10),
   a sensor (16) configured to sense a position of an object, including a teat of an animal, and
   a control unit (15) configured to control the first, second and third joint actuators to move the end effector (E) to the position sensed by the sensor (16),
   wherein each position of the end effector (E) within the workspace (W) corresponds to a single combination of the first, second and third angles, and
   wherein the end effector (E) comprises a center point (p), which defines the position of the end effector (E) (14) in a control algorithm included in the control unit (15) and provided for controlling the milking robot (10).

2. A milking robot according to claim 1, wherein the rotatability of the first link ($L_1$), the second link ($L_2$) and the third link ($L_3$) is limited by first, second and third stop means, respectively, so that the end effector (E) is retained within the workspace (W).

3. A milking robot according to claim 2, wherein the first, second and third stop means comprise respective physical stop members (35, 36).

4. A milking robot according to claim 2, wherein the first, second and third stop means comprise a software program comprised by the control unit (3).

5. A milking robot according to claim 1, wherein the workspace (W) tapers towards a line.

6. A milking robot according to claim 5, wherein the line which the workspace (W) tapers towards is a vertical line v through the first joint.

7. A milking robot according to claim 5, wherein the line which the workspace (W) tapers towards is a vertical line v through the first axis ($x_1$).

8. A milking robot according to claim 1, wherein the control algorithm of the control unit (15) is configured to calculate the first, second and third angles of the links ($L_1$, $L_2$, $L_3$) for a certain position of the center point (p).

9. A milking robot according to claim 1, wherein the third link ($L_3$) has a longitudinal center axis ($x_4$) and wherein the center point (p) is located on the longitudinal center axis ($x_4$).

10. A milking robot according to claim 1, wherein the end effector (E) is configured as a gripper (14) being attached to the third link ($L_3$), which has a longitudinal center axis ($x_4$) and wherein the gripper (14) is rotatable 180° around the longitudinal center axis ($x_4$).

11. A milking robot according to claim 7, wherein the gripper (14) is rotatable around the longitudinal center axis ($x_4$) to take one of a gripping position and an application position positioned 180° from the gripping position.

12. A milking robot according to claim 8, wherein the gripper (14) comprises a gripper element (19) which is rotatable around a fifth axis ($x_5$), extending perpendicularly to the longitudinal center ($x_4$), from a first gripper element position and a second gripper element position.

13. A milking robot according to claim 1, wherein the end effector (E) is constituted by the third link (L3).

14. A milking robot according to claim 13, wherein the end effector (E) comprises a nozzle for supplying a fluid onto the object.

15. A milking robot according to claim 1, wherein the first link ($L_1$) has a first active length ($l_1$), the second link ($L_2$) a second active length ($l_2$) and third link ($L_3$) a third active length ($l_3$), wherein the second and third active lengths ($l_2$, $l_3$) are at least twice the first active length ($l_1$) or wherein the first and second active lengths ($l_1$, $l_2$) are at least twice the third active length ($l_3$).

16. A milking robot according to claim 1, wherein the first joint actuator ($A_1$), the second joint actuator ($A_2$) and the third joint actuator ($A_3$) comprise first, second and third, respectively, compliance means configured to permit movement of the respective link in response to an externally exerted force when the external force exceeds a predetermined value.

17. A milking robot according to claim 16, wherein the first joint actuator ($A_1$), the second joint actuator ($A_2$) and the third joint actuator ($A_3$) comprise a respective hydraulic actuator operated by a hydraulic medium, and wherein the compliance means comprise at least one overflow valve (41, 42) configured to open for the hydraulic medium when the external force exceeds the predetermined value.

18. A milking arrangement further comprising a milking parlour comprising a plurality of milking places (2), each being configured to house an animal to be milked and each comprising a teatcup magazine (4) holding a set of teatcups (3), and at least one milking robot (10) according to claim 1, wherein said at least one milking robot (10) is provided beside the milking parlour.

19. A milking arrangement according to claim 18, wherein the milking parlour comprises a rotary milking platform (1).

20. A milking arrangement according to claim 19, wherein the milking arrangement further comprises at least one carrying device (C) configured to be positioned beside the rotary milking platform (1) and to carry the milking robot (10), and control means configured to control the carrying device (C) to support the milking robot (10) to follow the rotation of the rotary milking platform (1) so that the milking robot (10) is in a fixed position in relation to one of the milking places (2).

* * * * *